United States Patent [19]
Chiu

[11] Patent Number: 4,873,702
[45] Date of Patent: Oct. 10, 1989

[54] METHOD AND APPARATUS FOR DC RESTORATION IN DIGITAL RECEIVERS

[76] Inventor: Ran-Fun Chiu, 1295 Montclaire Way, Los Altos, Calif. 94022

[21] Appl. No.: 260,288

[22] Filed: Oct. 20, 1988

[51] Int. Cl.$^4$ .......................................... H04L 25/06
[52] U.S. Cl. .................................... 375/76; 307/359; 341/143
[58] Field of Search ................ 375/76; 307/357–359; 328/149; 341/143; 178/69 D

[56] References Cited

U.S. PATENT DOCUMENTS

| | | | |
|---|---|---|---|
| 3,509,279 | 4/1970 | Martin et al. | 375/76 |
| 4,186,384 | 1/1980 | Acker | 375/76 |
| 4,602,374 | 7/1986 | Nakamura et al. | 375/76 |

Primary Examiner—Robert L. Griffin
Assistant Examiner—Marianne Huseman

[57] ABSTRACT

A technique for eliminating unwanted dc offset voltages in a receiver for decoding a plurality of multilevel digitally modulated signals. The data transmission system is arranged to send a particular preamble signal each time a different data source begins transmission of its data. The preamble signal produces at the receiver output multiple cycles of maximum level excursions. During the period of time that the preamble signal is received, a signal processor in the receiver determines an initial dc offset value by averaging the level of the received digitally modulated signal. After the transmission of the preamble, the signal processor continually generates updated dc offset voltages which are equal to the sum of the previously generated dc offset voltage and the difference between the amplitude level represented by the received digitally modulated signal and the amplitude level of the closest "coding" amplitude level; the difference being multiplied by a scaling factor. Once a scaling factor is applied to the updated dc offset value, the result is added to the previous dc offset voltage. And, the process is continually repeated to produce updated dc offset voltages.

7 Claims, 4 Drawing Sheets

METHOD AND APPARATUS FOR DC RESTORATION IN DIGITAL RECEIVERS

BACKGROUND OF THE INVENTION

1. Field of the Invention

The present invention relates generally to the transmission of digital signals and more particularly to an improved technique for eliminating the effect of DC offset voltages in digital receivers particularly in nonwireline systems.

2. Description of the Prior Art

In digital communications, digitally modulated signals are demodulated usually by sampling the baseband signal at the baud interval and by comparing the sampled level with predetermined coded amplitude levels. In all such systems it is necessary to first eliminate any dc offset component in the baseband signal to be detected. Otherwise the zero level of the signal will be elevated (either +or −) and the detector will detect false levels because of the added dc voltage to the baseband signal. This translates into errors in the recovered data. By blocking the dc offset component, or restoring the true zero level to the baseband signal, the dfferential between the detector reference level and the zero signal level is eliminated.

In nonwire line systems, i.e. wireless transmission, restoring the true reference level is particularly important. And in an environment of multipoint digital communications, a digital receiver has to repeatedly switch between different transmitters to receive different signals from a number of various signal paths. With each different digital signal, a new dc offset level has to be established or the dc offset has to be blocked in each signal received. A digital transmitter can easily introduce an undesired frequency shift which translates as an added dc component in the demodulator in a frequency modulated system. It is very important to reset the dc reference level with each new transmitter as quickly as possible.

The traditional way that this problem is handled is through the use of series blocking capacitors in the receiver to block the dc component in the received data signal (provided the data itself is randomized and does not have any dc component). It is a cheap and fairly effective technique particularly for low speed data rates. To be effective the capacitor has to be fairly large so that the cutoff frequency is low. Unfortunately the larger the value of capacitance, the longer it takes to charge and discharge the device, which must be done every time a new signal enters a receiver or is powered up initially. Blocking capacitors typically take from 10 to 100 ms to charge, and in this amount of time significant amounts of data can be lost particularly for high speed data rates. Another problem encountered with simple blocking capacitors is caused by the apparent dc shift in the average data level which the data itself exhibits when particular strings of data occur, e.g. a long string of 1's. In multilevel data systems the data streams typically exhibit an apparent short-term dc component that shifts with the content of the data. When this occurs the blocking capacitor will shift the reference dc level which causes errors in the data receiver/decoder.

This invention is directed to an improved technique for eliminating the deleterious effect of dc offset voltages in digital receivers/decoders.

OBJECTS AND SUMMARY OF THE INVENTION

A general object of the invention is the provision of a device that will rapidly remove dc offset voltage in data streams to prevent false detection and decoding of the data.

Another object is of the invention is the provision of a data decoder having a dc restorer that will permit efficient operation in a point-to-multipoint communication system environment.

Still another object of the invention is the provision of a digital decoder that will track the slow dc variations that occur during long term transmissions.

Still another object of the invention is the provision of such an improvement to a digital decoder that will not falsely shift the dc level in multilevel data streams.

In accordance with the teachings of the present invention, these and other objects are achieved through provision of a digital decoder/ signal processor that decodes the received digitally modulated data from one of a plurality of remote sites and that also periodically generates a dc correction voltage $V_{off}$ which is fedback and subtracted in a summer circuit from the received digitally modulated signal. The generation of values for the dc correction voltage occurs in a two-step process. In the first step, the decoder generates an initial $V_{off}$ based upon an average voltage level of an integral cycle during an initial preamble period. Each remote site send a short preamble signal immediately prior to the transmission of its normal data. This preamble signal produces multiple cycles in the receiver such that the average ac component of the baseband signal is zero. The average voltage that exists at this time has to equal the initial dc offset voltage, $V_{off}$. In the second step, the decoder generates updated dc offset voltages ($V_e$) which are equal to the difference between the amplitude level represented by the sampled received signal and the amplitude level of the closest "coding" amplitude level. Once a scaling factor is applied to the updated dc offset value, the result is added to the previous dc offset voltage. And, the process is continually repeated to produce updated dc offset voltages.

BRIEF DESCRIPTION OF THE DRAWINGS

For a better understanding of the invention as well as other objects and further features thereof, reference is made to the following description which is to be read in conjunction with the accompanying drawings wherein.

DESCRIPTION OF PREFERRED EMBODIMENT

Figure 1:
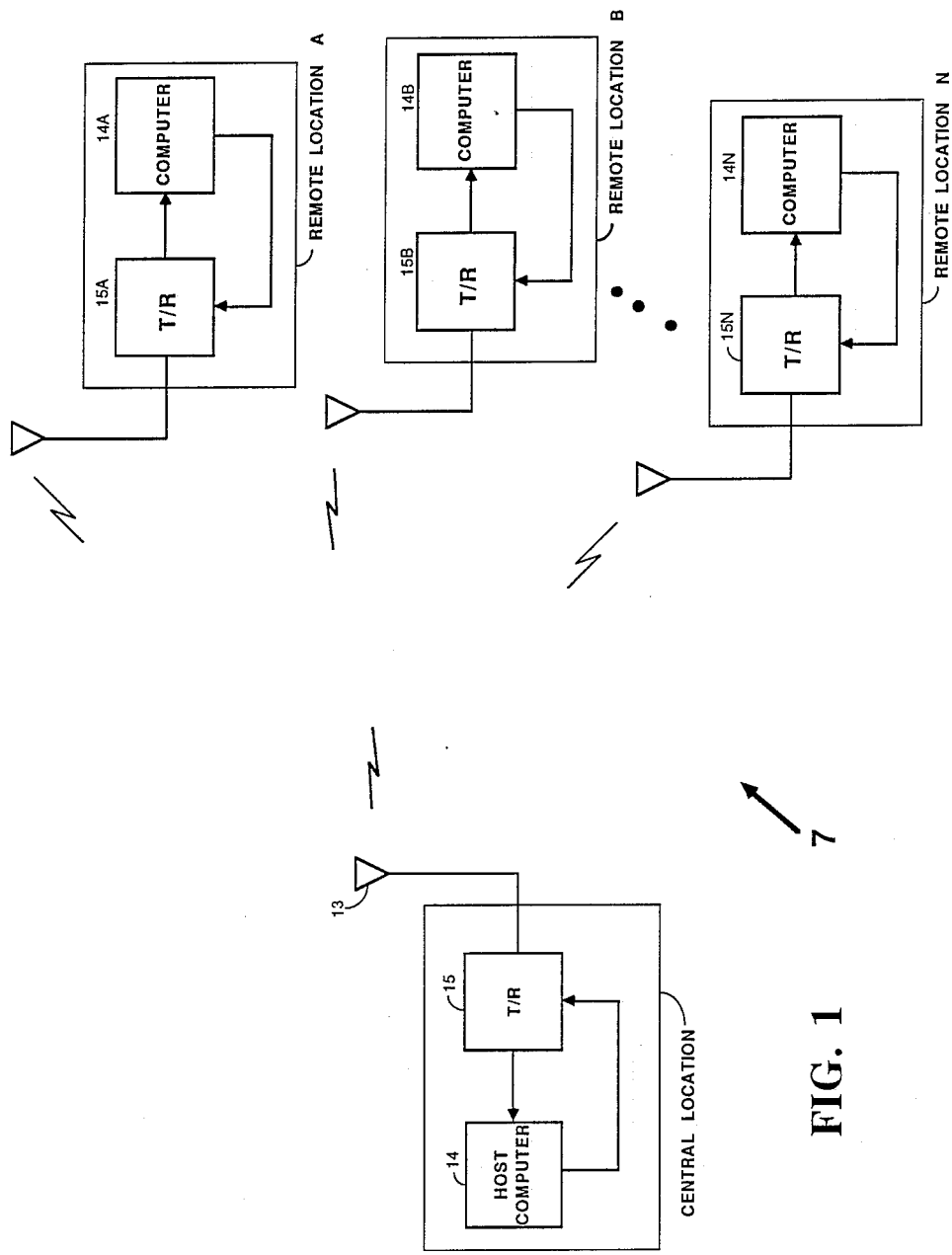
FIG. 1 is an illustration depicting a digital network configured in a multipoint transmission system wherein the present invention has particular utility.

For a better understanding of the subject invention, reference is made to the following description and appended claims in conjunction with the above-described drawings. Referring now to the drawings, FIG. 1 shows in block form a data communications network in which the present invention has application and includes a host computer system 14 and an associated microwave radio T/R (transmitter-receiver) pair 15. Typically the host computer system 14 and associated radio T/R pair 15 are co-located at a central location relative to a plurality of remote sites A–N. The host system 14 communicates with a plurality of other data terminal/computers 14A through 14N via the microwave communication system 7. Each remote operates on a transmit carrier frequency (e.g., 928 MHz with a modulation bandwidth of 25 kHz), while the host transmits at some other carrier frequency, e.g. 952 MHz. Each transmitter typically has a frequency tolerance of a few kHz (e.g. 0.0003% accuracy); therefore, although the carrier frequency of each remote is intended to be the same, there is normally a slight frequency difference between each remote transmitter. Each remote computer communicates with the host computer through its associated microwave radios 15A–15N. Functionally, the host system 14 communicates with any one of the other remote computers 14A–14N by poling the particular site with which the host wishes to communicate. As soon as one remote-to-central transmission is finished, the host system 14 commands T/R 15 to send a new transmit command to one of the other remote receivers, and upon receiving the command from the host system 14, the poled remote site computer commands the associated transmitter to begin transmitting data to receiver 15 at the central location. In asmuchas the central site radio receiver 15 must receive a new modulated carrier, which may have a slightly different carrier frequency, the receiver requires a short time period to re-acquire synchronization with a new remote transmitter. It is desireable to keep this so-called dead time as short as possible. At high data rates (e.g. 19.2 b/s) a 10-100 ms delay, which is typical of blocking capacitors, represents a significant delay and potential loss of data. An improved solution of this problem is shown in FIG. 2.

Figure 2:
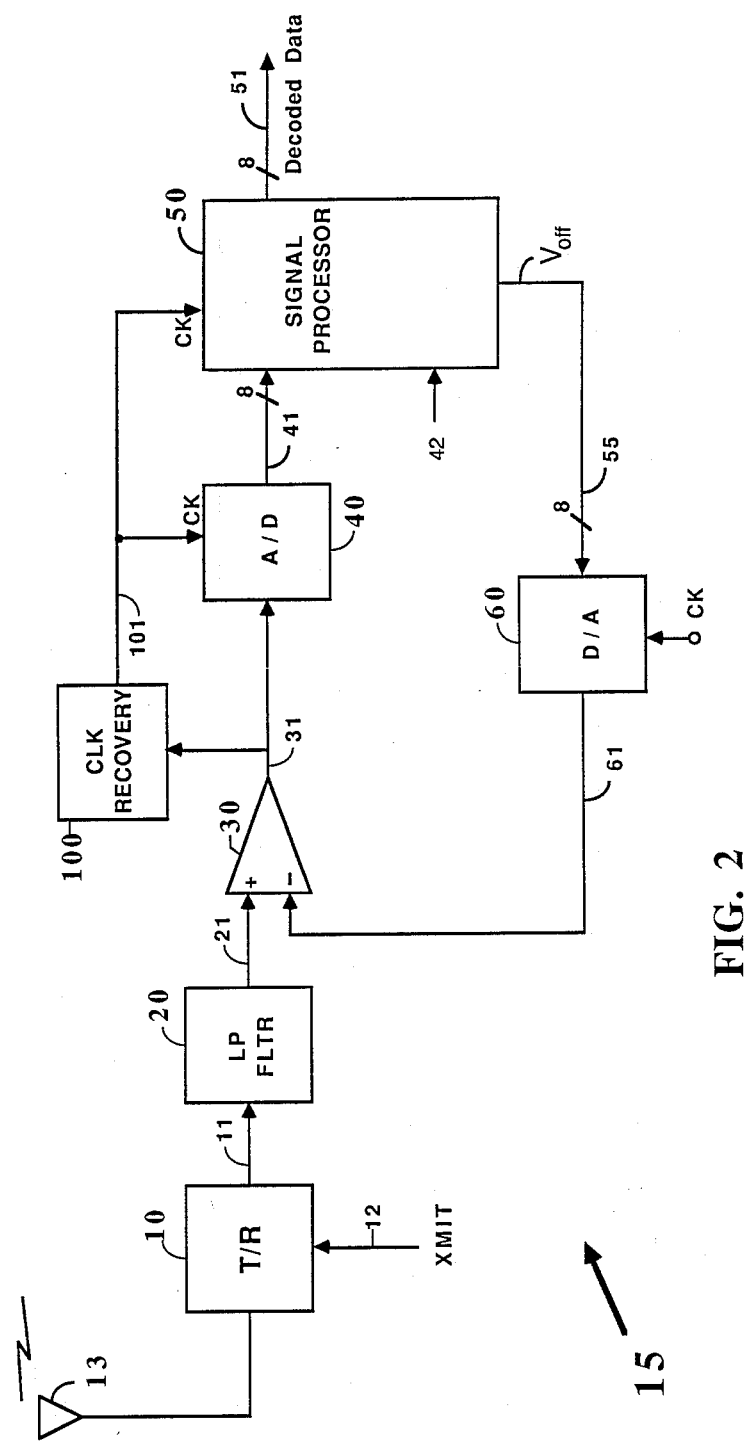
FIG. 2 is a block diagram of a digital receiver embodying this invention.

Referring to FIG. 2., the central site T/R 15 is shown in more detail. The RF/IF portion of the central communication system is included in T/R 10. The receive portion of the demodulated signal appears on path 11 and the transmit portion appears on path 12 of T/R 10. The remainder of the elements generally shown in FIG. 2 performs the function of clock recovery, data decoding and dc restoration. Lowpass filter 20 blocks any extraneous and unwanted signals generated in the radio 10. The filter output signal on path 21 represents the baseband encoded data set to a normalized ac voltage with an undesired amount of dc offset voltage $V_{off}$ impressed thereon. This analog signal passes through an analog summer circuit 30 before being digitized by A/D converter 40. The output digital signal on path 41 is an 8-bit binary signal having encoded therein the instantaneous amplitude of the analog signal on path 31 sampled at the time intervals controlled by the clock signal on paths 101. Each 8-bit byte is clocked into signal processor 50 where the data is decoded and processed. The host computer 14 shown in FIG. 1, connects to data bus 51 through an RS 232 interface to receive the data stream as decoded by the signal processor 50. A CLK recovery circuit 100, which is not considered a part of this invention, usually receives a demodulated output from T/R 10 or elsewhere in the baseband section, and generates timing clock signals which are distributed to A/D converter 40, signal processor 50, and D/A converter 60. There are a multitude of commercially available clock recovery circuits which are suitable for this purpose.

The digital output signal of signal processor 50 on path 55 represents the dc offset voltage $V_{off}$ present at the output of the receiver 10 on path 21. As will be explained, this voltage is fedback to the summer 30 to eliminate the offset from the analog input on path 21. D/A converter 60 converts the digital $V_{off}$ signal to a dc analog voltage whose amplitude corresponds to the digital value encoded therein. The output on path 61 is fedback to the "−" input of summer 30 which subtracts $V_{off}$ from the received baseband signal applied to the "+" input of summer circuit 30. The net effect of the subtraction process is to remove or cancel the dc component from the baseband signal thereby restoring the true reference level. The key to proper functioning of this dc removal is in how the offset voltage is derived from the encoded data signal.

Functionally signal processor 50 derives the proper offset voltage using a two-step process, which is a feature of this invention. The first step requires the transmission of a short preamble signal which generates in the receiver a repetitive ac baseband signal which has no ac component and which has peak-to-peak voltage swings during each cycle. The processor 51 takes the average dc level of at least one or more complete cycles during this preamble time period. In the preferred embodiment several cycles are sent from the remote and the first one such cycle is ignored to allow the radio and related circuitry to acquire the RF signal and to reach a steady-state condition. At that time a complete cycle (consisting of an 8-bit interval) is averaged to determine the dc component therein. In other words the remote transmitter must apply whatever data signal is required to cause the recovered baseband to go through at least one complete ac cycle having preferably maximum +and −excursions. Since the average ac component of such a transmitted baseband signal is zero, the average voltage which remains must equal the initial dc offset. Therefore, each time a new transmission takes place from any one of the remotes to the central location, a preamble code is impressed on the carrier to permit processor 50 to digitally average one complete cycle to set up an initial dc offset voltage. (For a 19.2 kb/s data rate, one complete cycle takes approximately 416 us.) This initial value of $V_{off}$ is fedback through D/A converter 60 to the "−" input to summer 30 to act as the initial offset voltage, i.e. the initial dc correction voltage.

The second step in the process is to determine a new offset voltage value to "update" the initial and thereafter subsequent offset voltage values. The second step occurs throughout the transmission of data to the central location and is applicable to any multilevel coded data. As will be illustrated in more detail in FIG. 3, signal processor 50 calculates at each sampling instant (i.e. at the clock interval) the voltage differential between a "measured signal voltage" and the closest coding voltage level that the signal "should be at". This measured differential (error) voltage $V_e$ is scaled by a fixed number $\alpha$ and is then added to the previous dc offset $V_i$. In more precise terms the correction voltage which is fedback to the summer circuit 30 is;

$$V_{off}{}^{n+1} = V_{off}{}^n + (1/\alpha)V_e{}^n,$$

where:

$V_{off}{}^n$ = the offset voltage at time nT;

$V_e{}^n$ = the error voltage at time nT as measured between the actual signal voltage and the closest normalized coding level;

$V_{off}{}^{n+1}$ = the offset voltage for the (n+1)T time;

α=a fixed number, such as 128; and
T=the sampling interval.

Figure 3:
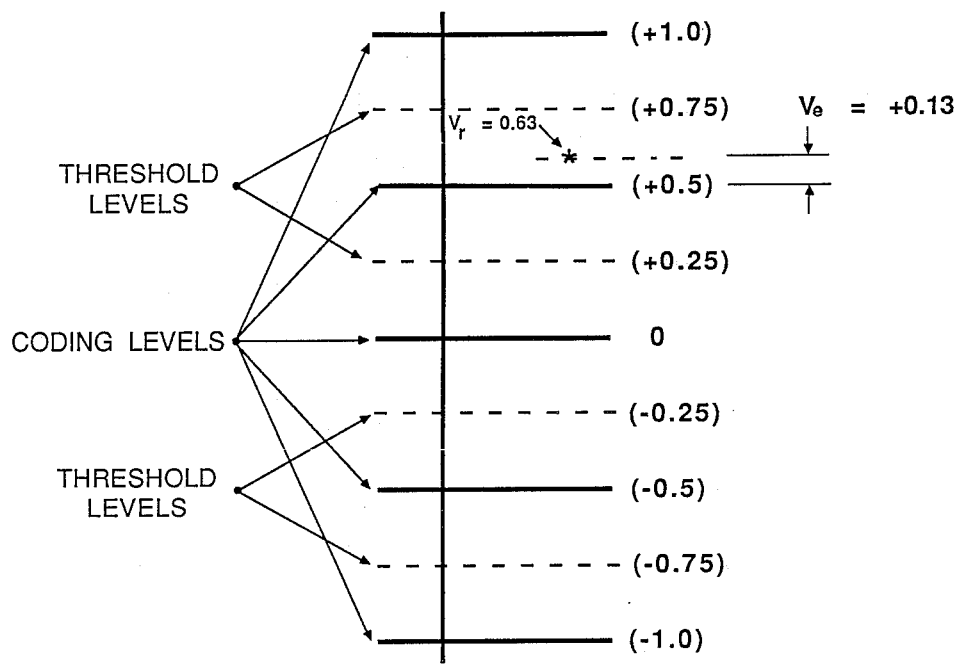
FIG. 3 is an illustration depicting the coding levels and threshold levels for a 5-level digital data signal.

The measurement of the offset voltages over a period of time is best understood with reference to FIG. 3, which depicts the five coding levels for a five-level coding system. (A five-level code was arbitarily chosen for purposes of illustrating the processor operation; however, it is a feature of this invention that any number of levels could easily be accomodated by structuring the internal measurement levels accordingly.) In a five-level binary code there are five discrete possible amplitude levels, e.g. +2, +1, 0, −1, −2, or using a normalized voltage scale (of $_{-}$+1) +1, +0.5, 0, −0.5, and −1 which are identical to the possible coding levels shown in FIG. 3. In such a coding system any received signal between +0.75 and +0.25 must be a +0.5 level, and any received signal above +1 must be a +0.75 level. Therefore the "threshold levels" are set half-way between each possible code level to adjust for any type of unwanted added noise component. For example if processor 50 received a digital signal representing a voltage of +0.63, as indicated in FIG. 3 by the [*], the processor would interpret this as a +0.5 code level with an error voltage $V_e$ of +0.13. This +0.13 offset or error voltage is not outputted onto path 55 until it is scaled by the scaling factor α and added to the offset voltage calculated from the previous clock interval. Processor 50 performs this calculation digitally for each digital word clocked into its input. The actual "calculation" or measurement is performed using the process inherent in the flow diagram shown in FIG. 4.

Figure 4:
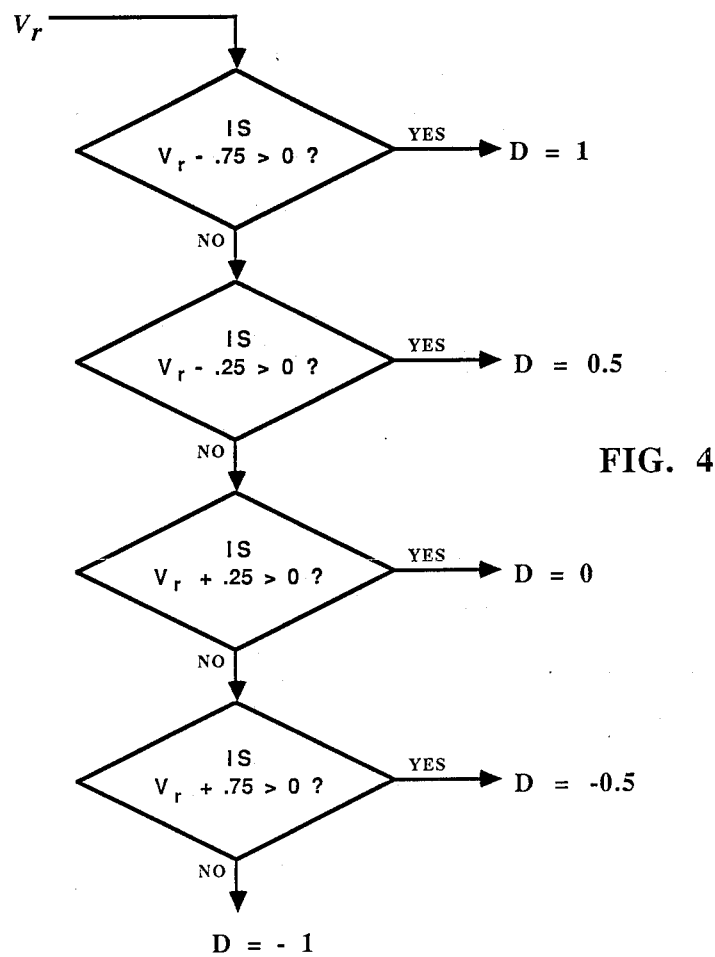
FIG. 4 is a flow diagram of a simple algorithm having application in the signal processor depicted in FIG. 2.

Referring to the diagram in FIG. 4, the signal voltage $V_r$ on path 41 is clocked into the processor and is tested until the proper coding 1 vel D is determined. By successively adding threshold values to $V_r$, the process determines the proper coding level as shown. Having determined a value for $V_r$, processor 50 subtracts the coding level (D in FIG. 4) from $V_r$ to determine the error voltage $V_e$. Processor 50 multiplies $V_e$ by a scaling factor α to reduce the effect of each instantaneous error voltage value on the offset voltage applied to the uncorrected normalized ac signal on path 21. Scaling factor α is selected for each particular data system based upon the characteristics of the system and the working environment. In the preferred embodiment of this invention α is usually selected to be 128. The more frequency stable the remote microwave transmitters, the larger α can be made. But, too large a number over-emphasizes the initial offset voltage and makes the correction system slow to respond.

When a transmitting remote site stops transmission, the central computer 14 sends a command to a new remote site, and the remote-to-central carrier stops momentarily until the carrier from the new remote appears at the central antenna 13. Processor 50 is disabled as soon as it notes the loss of a baseband signal. Because the transit time from one carrier to another may be exceedingly short, a carrier detect signal is applied from T/R 10 to inform processor 50 to except a preamble signal for the predetermined time interval and to recompute an initial $V_{off}$.

In the preferred embodiment of the invention a Texas Instruments TMS 32010 Digital Signal Processor was used for processor 50; however, many other signal processors/microprocessors would perform equally well. It is also possible to implement the correction voltage algorithm with discrete hardware.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings. For example, instead of using an analog summer circuit 30 it would be possible to perform its cancellation function after the A/D converter 40. This would eliminate the need for a D/A converter 60 since processor 50 outputs an offset voltage in digital form. In addition it would be possible to perform the cancellation function within the processor prior to taking the voltage differential "readings" used to calculate the updated dc offset voltage. There would be obvious advantages to such an arrangement.

What is claimed is:

1. In a digital communication system between a local receiver and between a plurality of remote data sources, each source selectively generating a digitially modulated signal having X predetermined amplitude levels, said remote sources providing a short preamble signal immediately prior to the transmission of one of said digitally modulated signals, said preamble signal characterized by a coding that produces multiple cycles of equal amplitude level excursions in said receiver, apparatus at said receiver for removing any dc offset voltage, $V_{off}$, from said digitally modulated signal, said apparatus comprising:

analog summing means having first and second inputs, said summing means for receiving one of said digitally modulated signals at said first input;

A/D converting means having a sampling interval T for periodically converting said digitally modulated signals from said summing means into a digitally formatted signal;

digital processing means for receiving said digitally formatted signal and for generating a dc offset voltage at time intervals nT, where n is an integer, said dc offset voltage being equal to $$V_{off}n+1 = V^n (1/\alpha)V_e n,$$

where;

$V^n$ = the offset voltage at time nT;

$V_e n$ = the offset voltage at time nT as measured by the voltage difference between said digitally formatted signal and the closest normalized coding level; and α=a predetermined number, such that at time n=1, V°, the initial offset voltage, is set equal to the average amplitude level during at least one of said multiple cycles during said preamble period; and means for feeding back said dc offset voltage to said second input, said summing means subtracting said offset voltage from said digital modulated signal.

2. The apparatus according to claim 1 in which said means for feeding back further comprises:

D/A converting means for periodically converting said digital $V_{off}$ into an analog signal.

3. The apparatus according to claim 2 where said X levels is 5.

4. The apparatus according to claim 3 where said preamble signal produces maximum amplitude level excursions.

5. The apparatus according to claim 2 where said X levels is 2.

6. In a digital communication system between a local receiver and between a plurality of remote data sources, each source selectively generating a digitally modulated signal having X predetermined amplitude levels, said remote sources providing a short preamble signal immediately pror to the transmission of one of said digitally modulated signals, said preamble signal characterized by a coding that produces multiple cycles of equal amplitude level excursions in said receiver, a process for removing any dc offset voltage, $V_{off}$, in said receiver from said digitially modulated signal, said process comprising the steps of:

periodically converting said digitially modulated signals into a digitally formatted signal at a repetition interval T;

digitally processing said digitally formatted signal for generating a dc offset voltage at time intervals nT, where n is an integer, said dc offset voltage being equal to $$V_{off}n+1 = V^n + (1/\alpha)V_e n,$$

where:

$V^n$ = the offset voltage at time nT;

$V_e n$ = the offset voltage at time nT as measured by the voltage difference between said digitally formatted signal and the closest normalized coding level; and $\alpha$ = a predetermined number, such that at time n=1, V°, the initial offset voltage, is set equal to the average amplitude level during at least one of said multiple cycles during said preamble period; and periodically converting said digital $V_{off}$ into an analog $V_{off}$ signal; and, summing said analog $V_{off}$ signal with said digital modulated signal prior to said first converting step so as to subtract out the unwanted dc offset voltage from said digital modulated signal.

7. In a digital communication system between a local receiver and between a plurality of remote data sources, each source selectively generating a digitally modulated signal having X predetermined amplitude levels, said remote sources providing a short preamble signal immediately prior to the transmission of one of said digitally modulated signals, said preamble signal characterized by a coding that produces multiple cycles of equal amplitude level excursions in said receiver, a process for removing any dc offset voltage, $V_{off}$, in said receiver from said digitially modulated signal, said process comprising the steps of:

periodically converting said digitally modulated signals into a digitally formatted signal at a repetition interval T;

digitally processing said digitally formatted signal for generating a dc offset voltage at time intervals nT, where n is an integer, said dc offset voltage being equal to $$V_{off}n+1 = V^n + (1/\alpha)V_e n,$$

where:

$V^n$ = the offset voltage at time nT;

$V_e n$ = the offset voltage at time nT as measured by the voltage difference between said digitally formatted signal and the closest normalized coding level; and $\alpha$ = a predetermined number, such that at time n=1, V°, the initial offset voltage, is set equal to the average amplitude level during at least one of said multiple cycles during said preamble period; and periodically summing said $V_{off}$ signal with said digitally formatted signal prior to said digitally processing step so as to subtract out the unwanted dc offset voltage from said digital modulated signal.

* * * * *